United States Patent
Hsia et al.

(10) Patent No.: US 11,788,972 B2
(45) Date of Patent: Oct. 17, 2023

(54) METHOD OF AUTOMATICALLY SETTING OPTICAL PARAMETERS AND AUTOMATED OPTICAL INSPECTION SYSTEM USING THE SAME

(71) Applicant: INDUSTRIAL TECHNOLOGY RESEARCH INSTITUTE, Hsinchu (TW)

(72) Inventors: Chi-Chun Hsia, Kaohsiung (TW); Ya-Chu Chuang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 315 days.

(21) Appl. No.: 17/243,798

(22) Filed: Apr. 29, 2021

(65) Prior Publication Data
US 2022/0373468 A1 Nov. 24, 2022

(51) Int. Cl.
*G01N 21/88* (2006.01)
*G01N 21/93* (2006.01)
(Continued)

(52) U.S. Cl.
CPC ......... *G01N 21/8803* (2013.01); *G01N 21/93* (2013.01); *G01N 21/9501* (2013.01);
(Continued)

(58) Field of Classification Search
CPC .............. G01N 21/8803; G01N 21/93; G01N 21/9501; G01N 2021/8887;
(Continued)

(56) References Cited

U.S. PATENT DOCUMENTS 7,973,921 B2 7/2011 Silberstein et al.
8,208,724 B2 6/2012 Lankoande et al.
(Continued)

FOREIGN PATENT DOCUMENTS

CN 105103189 A 11/2015
CN 105491271 A 4/2016
(Continued)

OTHER PUBLICATIONS

Lu et al., "Optimized Design of an AOI Illuminator," Proceedings of the 2007 International Conference on Wavelet Analysis and Pattern Recognition, Beijing, China, Nov. 2-4, 2007, pp. 924-928, 5 pages total.
(Continued)

*Primary Examiner* — Roy M Punnoose
(74) *Attorney, Agent, or Firm* — Birch, Stewart, Kolasch & Birch, LLP

(57) ABSTRACT

A method of automatically setting optical parameters, using Automatic Optical Inspection (AOI) System, the method includes the following steps. Firstly, a recommended object image is obtained when the AOI system is set under a first recommended optical parameter set. Then, a computation is performed on an object standard picture and a recommended object image to obtain a recommended error value between the object standard picture and the recommended object image according to an optimized error function. Then, whether the recommended error value converges is determined. Then, when the recommended error value does not converge, a computation is performed to obtain a second recommended optical parameter set according to the recommended error value and the first recommended optical parameter set. Then when the recommended error value converges, the first recommended optical parameter set is
(Continued)

decided as an optimal optical parameter set of the AOI system.

16 Claims, 8 Drawing Sheets

(51) Int. Cl.
  *G01N 21/95* (2006.01)
  *G01N 21/956* (2006.01)
(52) U.S. Cl.
  CPC ............. *G01N 2021/8887* (2013.01); *G01N 2021/95615* (2013.01); *G01N 2021/95638* (2013.01)
(58) Field of Classification Search
  CPC ......... G01N 2021/95615; G01N 2021/95638; G01N 21/8851; G05B 19/41875
  See application file for complete search history.

(56) References Cited

U.S. PATENT DOCUMENTS

| | | | |
|---|---|---|---|
| 10,255,385 | B2 | 4/2019 | Pandev et al. |
| 10,867,108 | B2 | 12/2020 | Chao |
| 2002/0009220 | A1 | 1/2002 | Tanaka |
| 2007/0121106 | A1* | 5/2007 | Shibata .............. G01N 21/8806 356/237.2 |
| 2012/0033852 | A1 | 2/2012 | Kennedy et al. |
| 2013/0144135 | A1 | 6/2013 | Mahfouz et al. |
| 2013/0273968 | A1 | 10/2013 | Rhoads et al. |
| 2014/0163375 | A1 | 6/2014 | Wasielewski |
| 2017/0347991 | A1 | 12/2017 | Mahfouz |
| 2018/0266968 | A1 | 9/2018 | Hirai et al. |
| 2019/0015423 | A1 | 1/2019 | Jacobs et al. |
| 2019/0240665 | A1 | 8/2019 | Lionberger et al. |
| 2020/0000436 | A1 | 1/2020 | Mahfouz |
| 2020/0113543 | A1 | 4/2020 | Wasielewski |
| 2020/0116636 | A1 | 4/2020 | Smedman et al. |

FOREIGN PATENT DOCUMENTS

| | | |
|---|---|---|
| CN | 109001112 A | 12/2018 |
| CN | 104838251 B | 4/2019 |
| CN | 110111343 A | 6/2019 |
| CN | 107561737 B | 5/2020 |
| CN | 111751279 A | 10/2020 |
| EP | 2 988 117 B1 | 4/2018 |
| TW | 200511387 A | 3/2005 |
| TW | 200733722 A | 9/2007 |
| TW | 200826644 A | 6/2008 |
| TW | I306165 B | 2/2009 |
| TW | 201120814 A1 | 6/2011 |
| TW | I346452 B | 8/2011 |
| TW | I357285 B | 1/2012 |
| TW | I359245 B1 | 3/2012 |
| TW | 201216707 A1 | 4/2012 |
| TW | I409569 B1 | 9/2013 |
| TW | I542869 B | 7/2016 |
| TW | 201728483 A | 8/2017 |
| TW | I594631 B | 8/2017 |
| TW | 201940879 A | 10/2019 |
| TW | I683262 B | 1/2020 |
| TW | 202013314 A | 4/2020 |
| TW | I717169 B | 1/2021 |

OTHER PUBLICATIONS

Wu et al., "Automatic Optical Inspection for Steel Golf Club," 2015 12th International Conference on Fuzzy Systems and Knowledge Discovery (FSKD), 2015, pp. 2332-2336, 5 pages total.

Zhang et al., "Automatic Optical Defect Inspection and Dimension Measurement of Drill Bit," Proceedings of the 2006 IEEE, International Conference on Mechatronics and Automation, Luoyang, China, Jun. 25-28, 2006, 6 pages total.

* cited by examiner

METHOD OF AUTOMATICALLY SETTING OPTICAL PARAMETERS AND AUTOMATED OPTICAL INSPECTION SYSTEM USING THE SAME

TECHNICAL FIELD

The disclosure relates in general to a method for automatically setting optical parameter and an automated optical inspection system using the same.

BACKGROUND

An optical inspection system could photograph a product (to-be-inspected object) to obtain an image of the product, and analyze the image to detect defect of the product. In order to improve the detection accuracy, the image captured by the automatic optical inspection system must have appropriate or optimal color information. Therefore, it is necessary to adjust optical parameter of the optical inspection system according to the environment or the to-be-inspected object. In current optical parameter setting, the optical parameter is adjusted on-site by experts based on experience.

However, such optical parameter setting has a risk of misjudgment. In addition, the set optical parameters adjusted by different experts are usually not exactly the same, and it may cause unstable quality control. On the other hand, in the case of a large number of optical parameter types, manual adjustment for optical parameters (manual dimming) by experts is quite time-consuming, and it may reduce production speed and efficiency.

SUMMARY

According to an embodiment, a method for automatically setting optical parameters is provided. The method for automatically setting optical parameters, suitable for an automatic optical inspection (Automated Optical Inspection, AOI) system, the AOI system includes a camera module, an error calculation module, an automatic setting module and an optical parameter recommendation module, the method includes the following steps: photographing, by the camera module, a to-be-inspected object to obtain a recommended object image under the AOI system being set with a first recommended optical parameter set; calculating, by the error calculation module, a recommended error value between an object standard picture and the recommended object image according to an optimized error function; determining, by the error calculation module, whether the recommended error value converges; when the recommended error value is determined not converged, calculating, by the optical parameter recommendation module, a second recommended optical parameter set according to the recommended error value and the first recommended optical parameter set, and setting, by the automatic setting module, the AOI system according to the second recommended optical parameter set; and when the recommended error value is determined converged, using, by the error calculation module, the first recommended optical parameter set as an optimal optical parameter set.

According to another embodiment, an AOI system is provided. The AOI system includes a camera module, an error calculation module, an optical parameter recommendation module and an automatic setting module. The camera module is configured to photograph a to-be-inspected object to obtain a recommended object image under the AOI system being set with a first recommended optical parameter set. The error calculation module is configured to calculate a recommended error value between an object standard picture and the recommended object image according to an optimized error function and determine whether the recommended error value converges. The optical parameter recommendation module is configured to calculate a second recommended optical parameter set according to the recommended error value and the first recommended optical parameter set when the recommended error value has not converged. The automatic setting module is configured to set the AOI system according to the second recommended optical parameter set. The error calculation module is further configured to use the first recommended optical parameter set as an optimal optical parameter set when the recommended error value has converged.

The above and other aspects of the disclosure will become better understood with regard to the following detailed description of the preferred but non-limiting embodiment(s). The following description is made with reference to the accompanying drawings.

Figure 1:
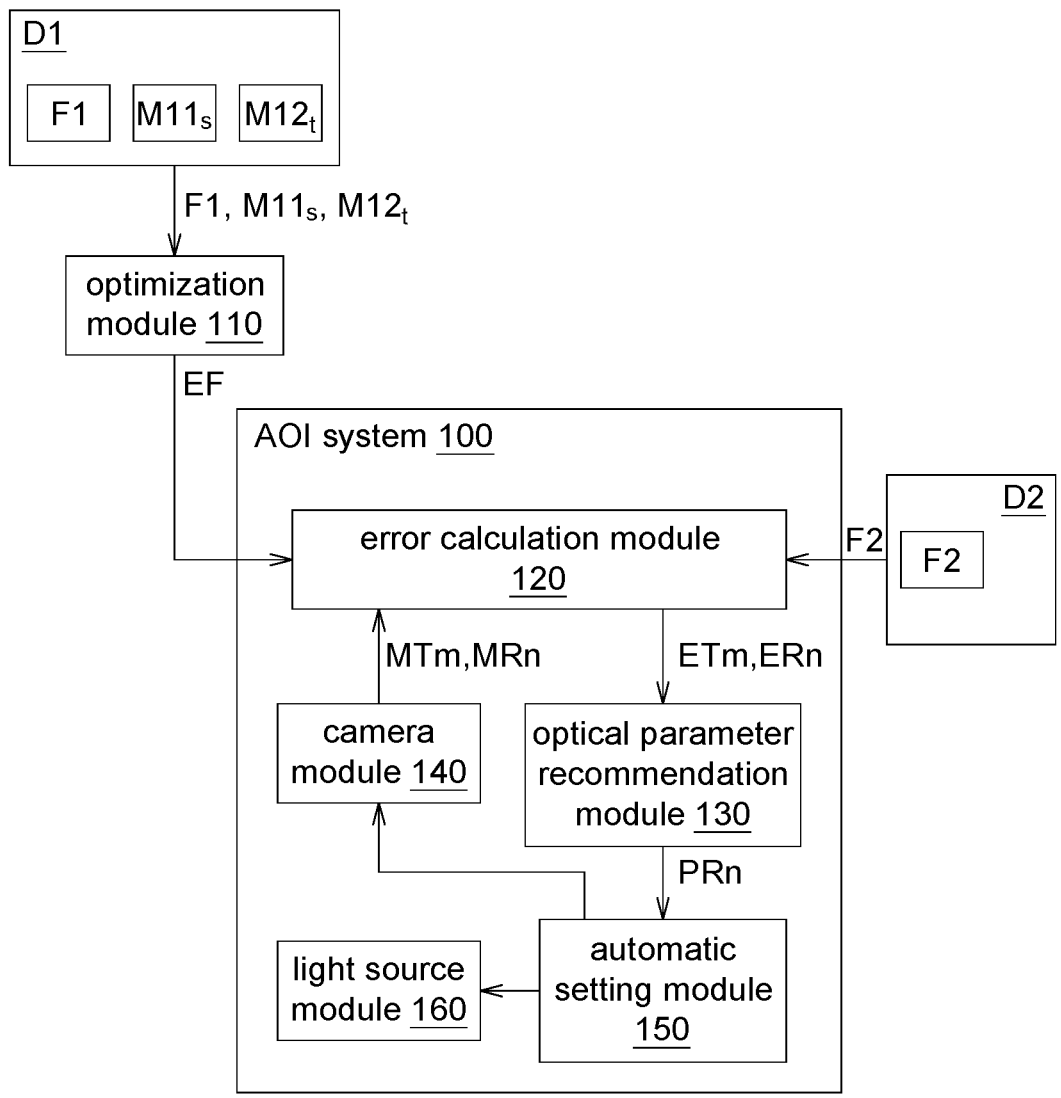
FIG. 1 shows a schematic diagram of an Automated Optical Inspection (AOI) system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2A:
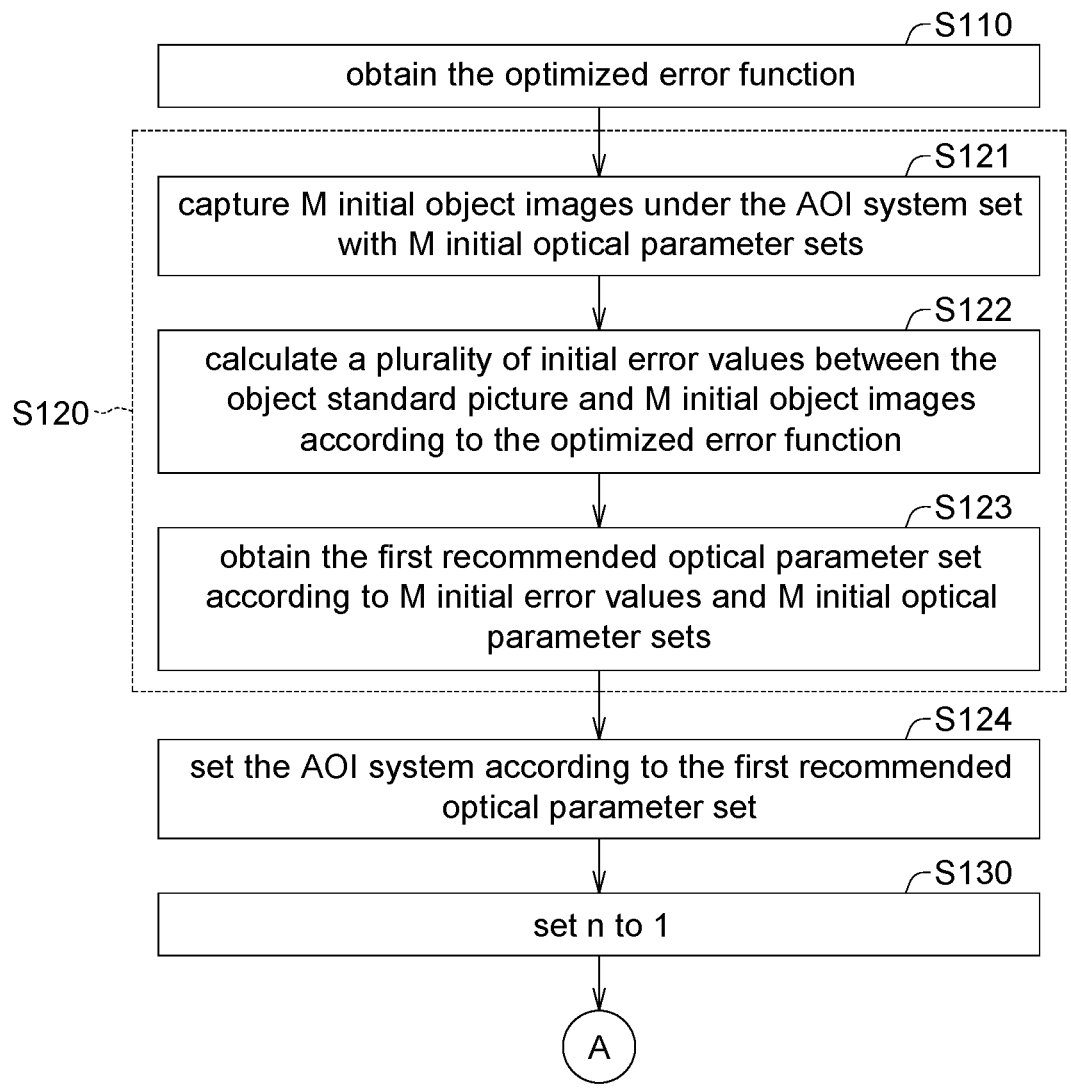
FIGS. 2A and 2B show a flowchart of a method of the AOI system of FIG. 1 for automatically setting an automatic optical parameter.
Figure 2B:
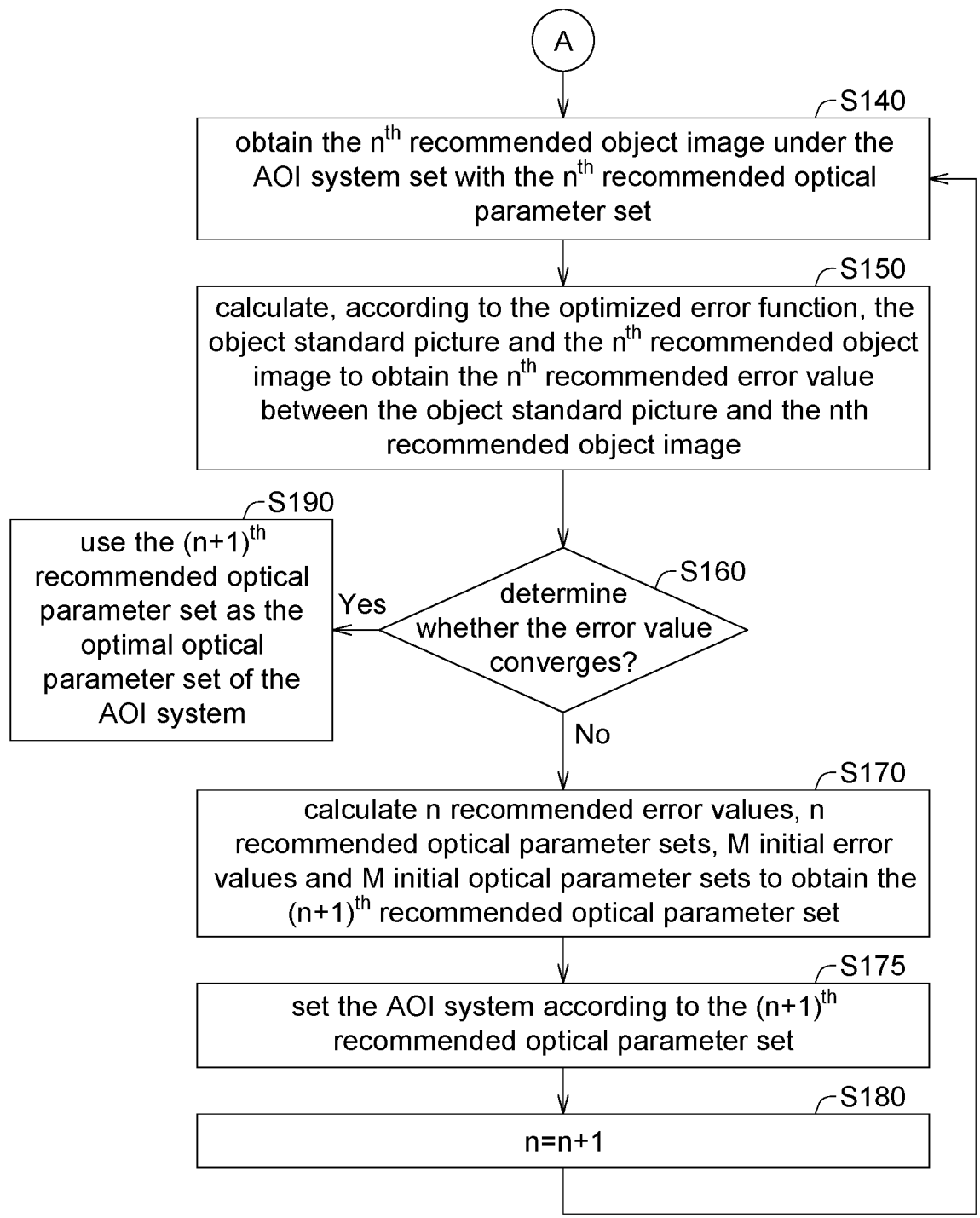
Figure 3A:
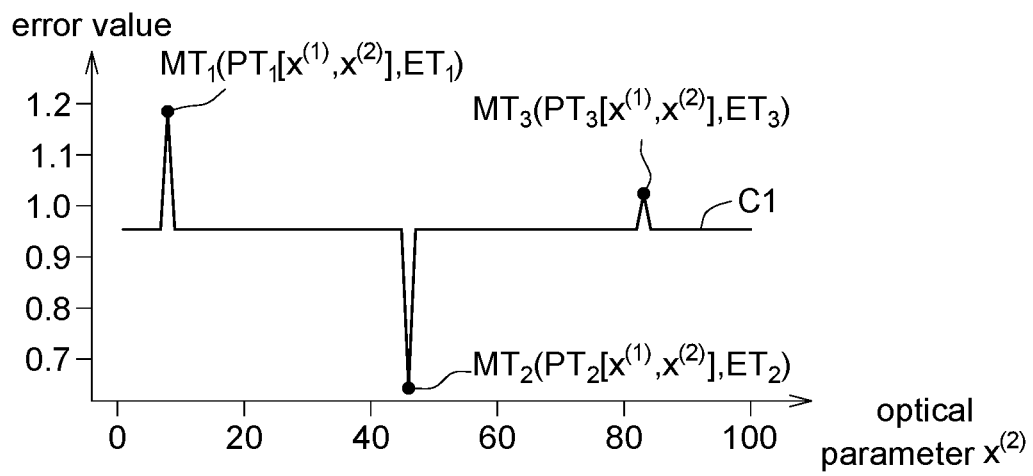
FIGS. 3A(a) to 3H(b) show the process of obtaining a recommended optical parameters group of FIGS. 2A and 2B.
Figure 3A:
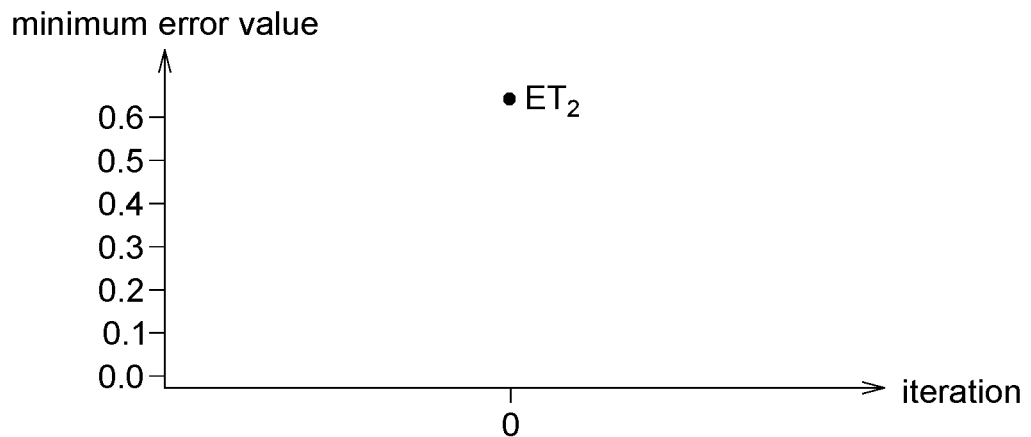

Referring to FIGS. 1 to 2 and 3A(a) to 3H(b), FIG. 1 shows a schematic diagram of an Automated Optical Inspection (AOI) system 100 according to an embodiment of the present disclosure, FIGS. 2A and 2B show a flowchart of a method of the AOI system 100 of FIG. 1 for automatically setting an automatic optical parameter, and FIGS. 3A(a) to 3H(b) show the process of obtaining a recommended optical parameter group $PR_n$ of FIGS. 2A and 2B.

As shown in FIG. 1, the AOI system 100 includes an optimization module 110, an error calculation module 120, an optical parameter recommendation module 130, a camera module 140, an automatic setting module 150 and a light source module 160. The camera module 140 is, for example, an optical camera or a linear optical scanner. The light source module 160 includes, for example, at least one light source (not shown). At least one of the optimization module 110, the error calculation module 120, the optical parameter recommendation module 130 and the automatic setting module 150 is, for example, a physical circuit (circuit) formed by at least one semiconductor manufacturing process, or formed by a firmware in an operation processor. In addition, at least one of the optimization module 110, the error calculation module 120, the optical parameter recommendation module 130, and the automatic setting module 150 could be integrated into ingle module, or integrated into a controller (not shown) or operation processor (not shown).

Figure 3B:
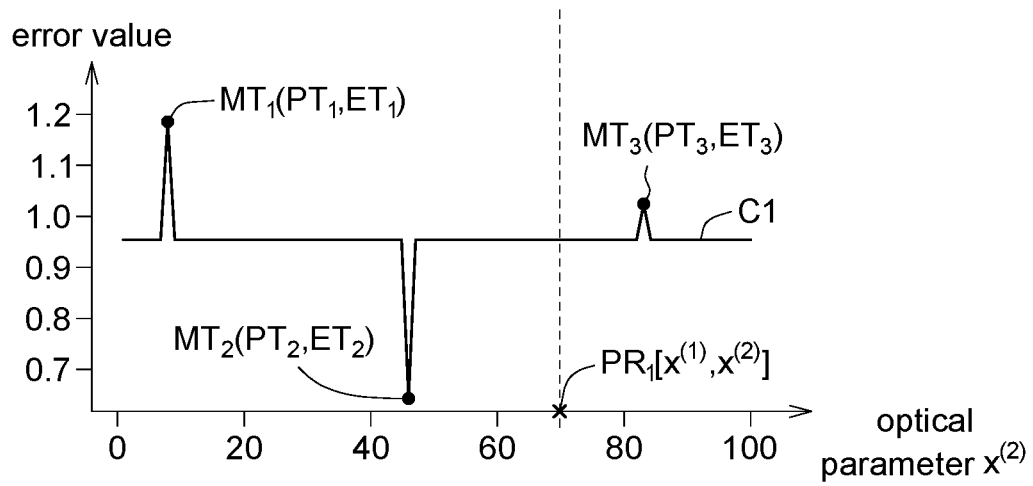

As shown in FIG. 1, under the AOI system 100 being set by the recommended optical parameter set $PR_n$ (for example, the first recommended optical parameter set $PR_1$ in FIG. 3B), the camera module 140 photograph a to-be tested object to obtain a recommended object image $MR_n$. The error calculation module 120 is configured to calculate a recommended error value $ER_n$ between the object standard picture F2 and the recommended object image $MR_n$ according to the optimized error function EF. Then, the error calculation module 120 determines whether the recommended error value $ER_n$ has converged. When the recommended error value $ER_n$ has converged, the error calculation module 120 determines that the recommended optical parameter set $PR_n$ (for example, the first recommended optical parameter set $PR_1$ in FIG. 3B) is the optimal optical parameter set of the AOI system 100. When the recommended error value $ER_n$ has not converged, the optical parameter recommendation module 130 is configured to calculate the recommended error value $ER_n$ and the first recommended optical parameter set $PR_1$ to obtain another recommended optical parameter set $PR_{n+1}$ (for example, the second recommended optical parameter set $PR_2$ in FIG. 3E). As a result, the AOI system 100 could automatically obtain the optimal optical parameter set, thereby improving the conventional manual dimming problem.

The "optical parameter set" herein includes, for example, at least one optical parameter type, such as P parameter types, wherein the $x^{(1)}$、 $x^{(2)}$、 $x^{(3)}$ . . . $x^{(P)}$ respectively represent different optical parameter types, such as light source parameter(s) of the light source module 160 and/or the camera parameter(s) of the camera module 140, wherein the light source parameters are optical parameter types such as color temperature, brightness, illuminating angle, illuminating time and/or illuminating angle of the illuminating light, etc., and the camera parameters are optical parameter types such as the exposure time of the camera module 140, etc. P represents the number of the optical parameter types, and the embodiment of the disclosure does not limit the maximum value of P. In the present embodiment, the number of the optical parameter types is two, for example, $x^{(1)}$ and $x^{(2)}$, which are the exposure time of the camera module 140 and the illuminating time of the light source module 160 respectively. The illuminating mode of the light source module 160 could be set by the automatic setting module 150 according to the relevant optical parameter type of the recommended optical parameter set $PR_n$, and the camera mode of the camera module 140 could be set by the automatic setting module 150 according to the relevant optical parameter type of the recommended optical parameter set $PR_n$. The light source module 160 provides the to-be-inspected object (not shown) with the illuminating light, and the camera module 140 photographs the to-be-inspected object to obtain the recommended object image of the to-be-inspected object. The aforementioned "to-be-inspected object" is, for example, any product that could be inspected online (for example, defect inspection, detection of product type, etc.) through the AOI system, such as semiconductor chips, circuit boards, etc. However, the present disclosure does not limit the type of the test object.

The description of the method of the AOI system 100 for automatically setting the optical parameter in the present embodiment of the present disclosure is described with the flowcharts in FIGS. 2A and 2B.

In step S110, the optimized error function EF is obtained. The optimized error function EF of the embodiment is obtained by calculation by the optimization module 110 (as shown in FIG. 1). However, in other embodiments, the optimized error function EF could be obtained in advance by performing offline calculations, and thus the AOI system could not include (or omit) the optimization module.

In step S110, the optimization module 110 calculates the training standard picture F1 (shown in FIG. 1), at least one expert standard image $M11_s$ (shown in FIG. 1) and at least one non-expert standard image $M12_t$ (shown in FIG. 1) to obtain the optimized error function EF, wherein S is a positive integer equal to or greater than 1, and the maximum value of S depends on the total number of the expert standard image $M11_s$; however, such exemplification is not meant to be for limiting. In addition, t is a positive integer equal to or greater than 1, and the maximum value of t depends on the total number of non-expert standard image $M12_t$; however, such exemplification is not meant to be for limiting. The number of the training standard pictures F1 is, for example, one, and the number of the expert standard images $M11_s$ could be at least one. Each expert could select one image that is closest (for example, it could be the closest in terms of various color information such as color temperature and brightness) to the training standard picture F1 from several images, and the image selected by each expert is defined as "expert standard image", and the unselected images are defined as "non-expert standard image(s)". The present embodiment of the disclosure does not limit the number of expert standard images $M11_s$ and the number of non-expert standard images $M12_t$. As shown in FIG. 1, the training standard picture F1, the expert standard image $M11_s$ and the non-expert standard image $M12_t$ could be stored in a first database D1, and the object standard picture F2 could be stored in a second database D2. At least one of the first database D1 and the second database D2 could belong to the AOI system 100, but the embodiment of the disclosure is not limited thereto.

In an embodiment, the optimization module 110 obtains the optimization weight $\Lambda$ of the optimized error function EF by minimizing the error between the training standard picture F1 and the expert standard image $M11_s$ and maximizing (or non-minimizing) the error between the training standard picture F1 and the non-expert standard image $M12_t$. For example, the optimization module 110 sets a target error TE1 (as shown in the following formula (1)) between the training standard picture F1 and the expert standard image $M11_s$ to 0 and sets a target error TE2 (as shown in the following formula (2)) between the training standard picture F1 and the non-expert standard image $M12_t$ to 1, to obtain the optimization weight $\Lambda$ (as shown in the following formula (3)) of the optimized error function EF. The error calculation function f of formulas (1) and (2) could use various error analysis techniques or mathematical methods to perform error analysis on the vectors in the error calculation function f, such as calculation of the weighted Euclidean distance or calculation of Mahalanobis distance; however, such exemplification is not meant to be for limiting.

$$f(V1, U1_s | \Lambda) = TE1 \quad (1)$$

$$f(V1, W1_t | \Lambda) = TE2 \quad (2)$$

$$e = \sum_s (f(V1, U1_s | \Lambda))^2 + \sum_t (1 - f(V1, W1_t | \Lambda))^2 \quad (3)$$

$$\overline{\Lambda} = \underset{\Lambda}{\operatorname{argmin}} \sum_s (f(V1, U1_s | \Lambda))^2 + \sum_t (1 - f(V1, W1_t | \Lambda))^2 \quad (4)$$

In formula (1), the vector V1 is, for example, pixel-level characteristic vector of the training standard picture F1, and the vector U1$_s$ is, for example, pixel-level characteristic vector of the S$^{th}$ expert standard image M11$_s$. In formula (2), the vector W1$_t$ is, for example, pixel-level characteristic vector of the t$^{th}$ non-expert standard image M12$_t$. In formula (3), e is the total error value, and the optimization weight Λ is obtained under the sum of the error value of all expert standard images and the error value of all non-expert standard images is 0 or close to 0. In formula (4), the optimization module 110 could optimize the optimization weight Λ by using the mathematical method of argmin. For example, the optimization module 110 could determine the optimization weight Λ corresponding to the smallest total error value e as optimal optimization weight $\overline{\Lambda}$. The optimal optimization weight $\overline{\Lambda}$ is, for example, a matrix including at least one constant or multiple constants. In the present embodiment, the vector V1, the vector U1$_s$ and the vector W1$_t$ are pixel-level characteristic vectors, such as RGB or HSV (Hue, Saturation, Lightness), but in other embodiments, the vector V1, the vector U1$_s$ and the vector W1$_t$ could be the image-level characteristic vectors, for example, the characteristic vectors extracted from deep learning models.

After the optimal optimization weight $\overline{\Lambda}$ is obtained, the optimized error function EF could be created according to the optimal optimization weight $\overline{\Lambda}$, as shown in the following formula (5). In formula (5), the vector V2 is the pixel-level characteristic vector of the standard picture (for example, the object standard picture), and the vector U2 is the pixel-level characteristic vector of the object image (for example, the initial object image and/or the recommended object image). In the present embodiment, the vectors V2 and U2 are the pixel-level characteristic vectors, for example, RGB or HSV (Hue, Saturation, Lightness). However, in other embodiments, the vectors V2 and U2 could also be the image-level characteristic vectors, for example, the characteristic vectors extracted by the deep learning model.

After substituting the vectors V2 and U2 into the formula (5), the error value (for example, the initial error value and/or the recommended error value) between the vectors V2 and U2 is obtained (or calculated) according to the optimized error function EF, wherein the error value represents the difference between the object image and the standard picture F2. The smaller the error value is, the smaller (for example, the closer the image is in color information) the difference between the vectors V2 and U2 is. On the contrary, the greater the error value is, the greater the difference between the vectors V2 and U2 is.

$$EF(V2,U2|\overline{\Lambda})=ET_m \text{ 或 } ER_n \ldots ($$

After the optimized error function EF is obtained, steps S120 to S190 could be performed to determine the optical parameter set for automatic setting the optical parameters. For clarity, the steps S120 to S190 of the method for automatically setting the optical parameter in the present embodiment are used to determine the optical parameter set, wherein the optical parameter set includes two optical parameter types, for example, x$^{(1)}$ and x$^{(2)}$. In an embodiment, in the steps of determining the optical parameter set (for example, steps S120 to S190), the x$^{(2)}$ (for example, the axis of abscissa of the coordinates in FIGS. 3A(a) to 3H(b)) is determined in the case of x$^{(1)}$ being a fixed value. In another embodiment, in the steps of determining the optical parameter set (for example, steps S120 to S190), the x$^{(1)}$ and x$^{(2)}$ are determined in the case of x$^{(1)}$ and x$^{(2)}$ being variable. In other embodiments, the optical parameter set could include P optical parameter types x$^{(1)}$、x$^{(2)}$、x$^{(3)}$ . . . x$^{(P)}$, and the steps for determining the optical parameter set is performed under the case that at least one of x$^{(1)}$、x$^{(2)}$、x$^{(3)}$ . . . x$^{(P)}$ is variable.

In step S120, the AOI system 100 could calculate the object standard picture F2 of M initial object image MT$_m$, according to the optimized error function EF, to obtain the first recommended optical parameter set PR$_1$. The subscript m of the symbol MT$_m$ represents the m$^{th}$ initial object image, wherein m is a positive integer ranging between 1 to M, and M is the total number of initial object images. The present disclosure does not limit the maximum value of M.

Step S120 could include steps S121 to S123.

In step S121, in the case of the AOI system 100 being set with M initial optical parameter sets PT$_m$, the camera module 140 captures M initial object images MT$_m$. For example, in the case of the AOI system 100 being set with the initial optical parameter set PT$_1$, the camera module 140 captures the initial object images MT$_1$. Then, in the case of the AOI system 100 being set with the initial optical parameter set PT$_2$, the camera module 140 captures the initial object images MT$_2$. As a result, the AOI system 100 is successively set with M initial optical parameter sets PT$_m$, and the camera module 140 successively captures M initial object images MT$_m$. The optical parameter types included in the initial optical parameter sets PT$_m$ are not limited in the present disclosure. As shown in FIG. 3A(a), the number of the initial optical parameter sets PT$_m$ of the present embodiment of the present disclosure are three (that is, M=3), such as the initial optical parameter sets PT$_1$, PT$_2$ and PT$_3$. The initial optical parameter sets PT$_1$, PT$_2$ and PT$_3$ could be expressed as PT$_1$[x$^{(1)}$, x$^{(2)}$], PT$_2$[x$^{(1)}$, x$^{(2)}$] and PT$_3$[x$^{(1)}$, x$^{(2)}$], the other optical parameter sets have similar expression forms, and the similarities will not be repeated here.

In step S122, the error calculation module 120 calculates the object standard picture F2 and M initial object image MT$_m$, according to the optimized error function EF, to respectively obtain M initial error value ET$_m$ between M initial object image MT$_m$ and the object standard picture F2, wherein m is a positive integer ranging between 1 to M. As shown in FIG. 3A(a), the number of the initial error value ET$_m$ of the present embodiment of the present disclosure are three (i.e., M=3), such as the initial error values ET$_1$, ET$_2$ and ET$_3$.

In FIG. 3A(a), a curve C1 represents the relationship between the optical parameter set and the error value in the 0$^{th}$ iteration, and each point in FIG. 3A(b) represents the minimum one (called the "minimum error value") of the error values in the iteration. FIGS. 3B to 3H(b) have similar definition, and similarities will not be repeated here. In the stage of the method for automatically setting the optical parameter of FIG. 3A(b), the recommended optical parameter set PR$_n$ has not been introduced into the calculation (the iteration process of steps S140 to S180 has not been performed), and thus the iteration corresponding to the minimum error value is 0$^{th}$.

In step S123, the optical parameter recommendation module 130 calculates M initial error value ET$_m$ and M initial optical parameter sets PT$_m$ to obtain the first recommended optical parameter set PR$_1$.

In the method for automatically setting the optical parameter, the optical parameter recommendation module 130 could use one of a plurality of implementations to determine the optical parameter sets. For example, the optical parameter recommendation module 130 could obtain the recommended optical parameter set according to formulas (6) to (7). However, as long as the recommended optical parameter set could be obtained, the method of obtaining the recommended optical parameter set in the present embodiment of the present disclosure is not limited to using formulas (6) to (7).

$$\text{Corr}(xT_i, xR_j) = \exp\left\{-\sum_{k=1}^{P} \theta_k \left|xT_i[x^{(k)}] - xR_j[x^{(k)}]\right|^2\right\} \quad (6)$$

$$\Phi(xR_j) = E\left(\sum_{i=1}^{Q} \frac{EF(V2, U2_i | \overline{\Lambda})}{\text{Corr}(xT_i, xR_j)} < f_{min}\right) \quad (7)$$

In formulas (6) and (7), $xR_j$ is the candidate optical parameter set, wherein j is a positive integer between 1 to J which could represent that $xR_j$ is the $j^{th}$ candidate optical parameter set, and J is the number of the candidate optical parameter sets. $xR_j$ includes a plurality of the optical parameter types, and it could be represented by $xR_j[x^{(1)}, x^{(2)}, x^{(3)}, \ldots, x^{(P)}]$. The candidate optical parameter set could be one that has not been calculated to obtain the error value among all optical parameter sets. The embodiment of the present disclosure does not limit the maximum value of J, and it could depend on the number of optical parameter types and/or the value range thereof.

In formulas (6) and (7), $xT_i$ is the selected optical parameter set, wherein i is a positive integer between 1 and Q and represents the $i^{th}$ selected optical parameter set, and Q is the number of the selected optical parameter sets. $xT_i$ includes a plurality of the optical parameter types, and it could be expressed as $xT_i[x^{(1)}, x^{(2)}, x^{(3)}, \ldots, x^{(P)}]$. The selected optical parameter set $xT_i$ includes the initial optical parameter sets $PT_m$ and/or recommended optical parameter sets $PR_n$ from which the error values have been derived. For example, in FIG. 3B (in the first iteration), the selected optical parameter sets $xT_i$ includes the initial optical parameter sets $PT_1$, $PT_2$ and $PT_3$ of FIG. 3A(a) (drawn as solid dots). In FIG. 3D (in the second iteration), the selected optical parameter sets $xT_i$ includes the initial optical parameter sets $PT_1$, $PT_2$ and $PT_3$ of FIG. 3C(a) and the first recommended optical parameter set $PR_1$ (drawn as solid dots). In formula (6), $\theta_K$ represents the weight of the $k^{th}$ optical parameter type $x^{(k)}$ and is a constant. The values of several weights $\theta_K$ of different several optical parameter types $x^{(k)}$ could be different or the same. In addition, the aforementioned k is a positive integer between 1 and Q, wherein Q is the number of the selected optical parameter sets. The number of the recommended optical parameter sets increases with the number of iterations, that is, the value of Q increases accordingly. The maximum value of Q depends on the number of the iterations, and the present disclosure does not limit the maximum value of Q.

In formula (6), $\text{Corr}(xT_i, xR_j)$ is the difference between the $j^{th}$ candidate optical parameter set $xR_j$ and the $i^{th}$ selected optical parameter set $xT_i$. In the calculation of the exponential function "exp", the greater the difference between the $j^{th}$ candidate optical parameter set $xR_j$ and the $i^{th}$ selected optical parameter set $xT_i$ is, the smaller the value of $\text{Corr}(xT_i, xR_j)$ is; however, the smaller the difference between the $j^{th}$ candidate optical parameter set $xR_j$ and the $i^{th}$ selected optical parameter set $xT_i$ is, the greater the value of $\text{Corr}(xT_i, xR_j)$ is.

In formula (7), $\Phi(xR_j)$ is the $j^{th}$ expected value (or probability) of the $j^{th}$ candidate optical parameter set $xR_j$ with respect to all the selected optical parameter set $xT_i$, wherein the expected value $\Phi(xR_j)$ ranges between, for example, 0 to 1. The expected value analysis function E is configured to obtain the expected value of the $j^{th}$ candidate optical parameter set $xR_j$ with respect to all the $i^{th}$ selected optical parameter set $xT_i$ by using various statistical or probability analysis techniques. Q represents the number of all the $i^{th}$ selected optical parameter set $xT_i$. For example, in FIG. 3B (the first iteration), the number of the selected optical parameter sets $xT_i$ are three (for example, the number of solid dots), that is, Q is equal to 3. In FIG. 3D (in the second iteration), the number of the selected optical parameter sets $xT_i$ are four (for example, the number of solid dots), that is, Q is equal to 4.

In formula (7), $f_{min}$ represents the minimum one of the error values corresponding to the selected optical parameter sets $xT_i$. For example, in FIG. 3B (in the first iteration), $f_{min}$ is the latest initial error value $ET_2$ (as shown in FIG. 3A(b)) in the current iteration. In FIG. 3D (in the second iteration), $f_{min}$ is the latest minimum error value in the current iteration, that is, the rightmost initial error value $ET_2$ (i.e., the minimum one of the initial error value $ET_1$ to $ET_3$) in FIG. 3C(b). In FIG. 3F (in the third iteration), $f_{min}$ is the latest minimum error value in the current iteration, that is, the rightmost initial error value $ET_2$ (i.e., the minimum one of the initial error value $ET_1$ to $ET_3$ and the recommended error value $ER_1$) in FIG. 3E(b).

In formula (7), $EF(V2, U2_i|\overline{\Lambda})$ could represent the error value between the image-level characteristic vector V2 of the object standard picture F2 and the image-level characteristic vector $U2_i$ of the $i^{th}$ selected image, wherein the selected image refers to the image that has been used to be calculated for obtaining the error value. For example, in FIG. 3B (in the first iteration), the selected image is the initial object image $MT_1$ (it is obtained by the camera module 140 according to the first initial optical parameter set $PT_1$ in FIG. 3A(a)), the initial object image $MT_2$ (it is obtained by the camera module 140 according to the second initial optical parameter set $PT_2$ in FIG. 3A(a)) and the initial object image $MT_3$ (it is obtained by the camera module 140 according to the third initial optical parameter set $PT_3$ in FIG. 3A(a)). In FIG. 3D (in the second iteration), the selected images are the initial object images $MT_1$, $MT_2$ and $MT_3$ and the first recommended object image $MR_1$ (it is obtained by the camera module 140 according to the first initial optical parameter set $PT_1$ in FIG. 3C(a)). In the present embodiment, the vectors V2 and $U2_i$ are the image-level characteristic vectors, for example, RGB or HSV (Hue, Saturation, Lightness). However, in other embodiments, the vectors V2 and $U2_i$ could also be the image-level characteristic vectors, for example, the characteristic vectors extracted by the deep learning model.

As shown in formulas (6) and (7), when the greater the difference of the $j^{th}$ candidate optical parameter set $xR_j$ with respect to the $i^{th}$ selected optical parameter set $xT_i$ is (that is, the smaller the value of $\text{Corr}(xT_i, xR_j)$ is), the greater the expected value is, and it means that the $j^{th}$ candidate optical parameter set $xR_j$ has a greater probability of generating a smaller error value than $f_{min}$. Each candidate optical parameter set could obtain one expected value $\Phi(xR_j)$. The optical parameter recommendation module 130 could use J candidate optical parameter sets $xR_j$ with different values to obtain corresponding J expected values $\Phi(xR_j)$, and use the $j^{th}$ candidate optical parameter set $xR_j$ corresponding to the maximum one of the J expected values $\Phi(xR_j)$ as the recommended optical parameter set $PR_n$.

Figure 3C:
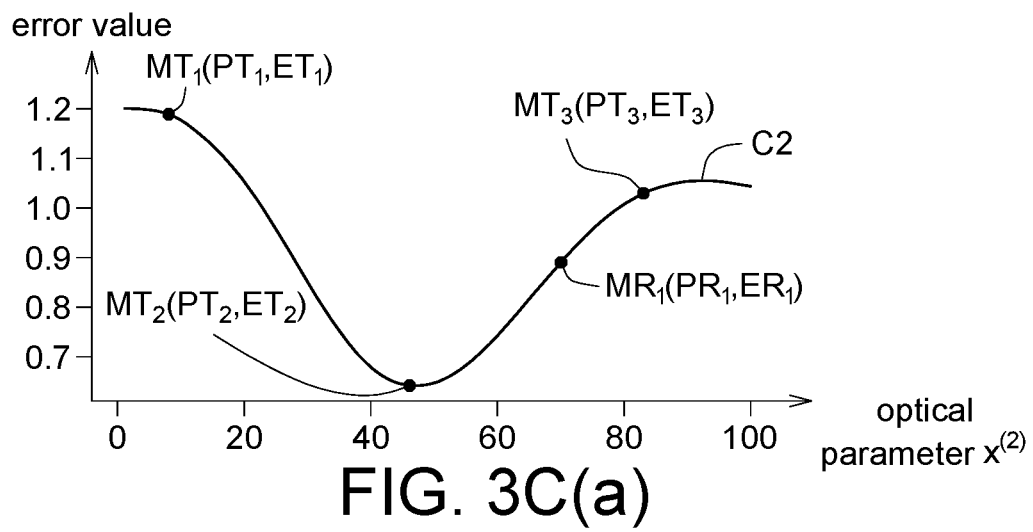
Figure 3C:
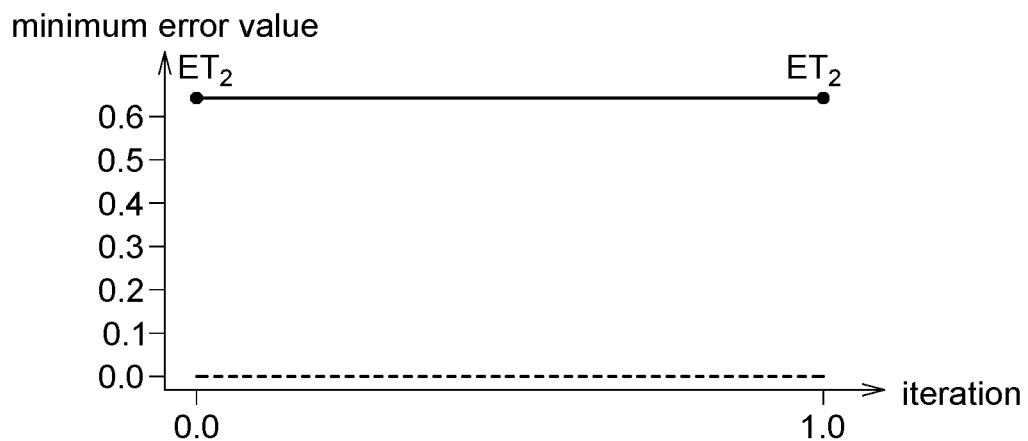
Figure 3D:
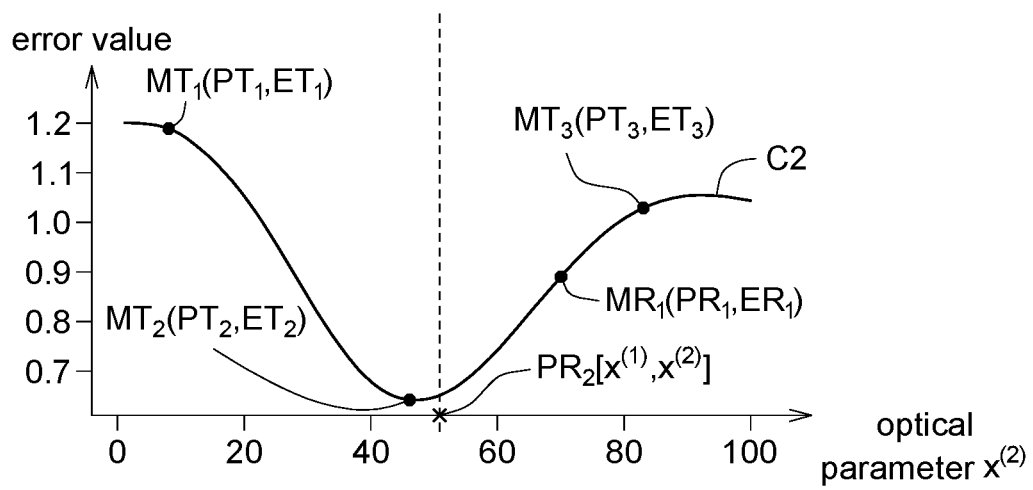

Referring to FIGS. 3B to 3C(b), the process of obtaining the first recommended optical parameter set $PR_1$ based on formulas (6) to (7) is described below. The optical parameter recommendation module 130 first obtains several expected values $\Phi(xR_j)$ of several candidate optical parameter sets $xR_j$ with respect to all the selected optical parameter sets $xT_i$, and then uses (selects) the candidate optical parameter sets $xR_j$ corresponding to the maximum one of the expected values $\Phi(xR_j)$ as the first recommended optical parameter set. The process of obtaining the expected value $\Phi(xR_1)$ of the first candidate optical parameter set $xR_1$ is described below.

As shown in FIG. 3A(a), when the number of the selected optical parameter sets $xT_i$ is 3 (Q=3), and formula (6) is calculated in case of the initial optical parameter sets $PT_m$ including $PT_1$, $PT_2$ and $PT_3$. In case of i being equal to 1 and j being equal to 1, the optical parameter recommendation module 130 performs the calculation of formula (6) to obtain the first selected optical parameter set $xT_1$ (for example, the initial optical parameter set $PT_1$) and the value of $Corr(xT_1, xR_1)$ of the first candidate optical parameter set $xR_1$ (calculation formula: $Corr(xT_1, xR_1) = \exp\{-\Sigma_{k=1}^{P}\theta_k |xT_1[x^{(k)}] - xR_1[x^{(k)}]|^2\}$) and obtain the initial error value $ET_1$ (the initial error value $ET_1$ is the result value of $EF(V2, U2_1|\overline{A})$ of formula (7)) of the pixel-level characteristic vector $V2$ of the object standard picture F2 and the pixel-level characteristic vector $U2_i$ of the first selected image (for example, the first initial object image $MT_1$).

In case of i being equal to 2 and j being equal to 1, the optical parameter recommendation module 130 performs the calculation of formula (6) to obtain the second selected optical parameter set $xT_2$ (for example, the initial optical parameter set $PT_2$) and the value of $Corr(xT_2, xR_1)$ of the first candidate optical parameter set $xR_1$ (calculation formula: $Corr(xT_2, xR_1) = \exp\{-\Sigma_{k=1}^{P}\theta_k |xT_2[x^{(k)}] - xR_1[x^{(k)}]|^2\}$) and obtain the initial error value $ET_2$ (the initial error value $ET_2$ is the result value of $EF(V2, U2_2|\overline{A})$ of formula (7)) of the pixel-level characteristic vector $V2$ of the object standard picture F2 and the pixel-level characteristic vector $U2_2$ of the second selected image (for example, the second initial object image $MT_2$).

In a case of i being equal to 3 (value of Q) and j being equal to 1, the optical parameter recommendation module 130 performs the calculation of formula (6) to obtain the third selected optical parameter set $xT_3$ (for example, the initial optical parameter set $PT_3$) and the value of $Corr(xT_3, xR_1)$ of the first candidate optical parameter set $xR_1$ (based on formula $Corr(xT_3, xR_1) = \exp\{-\Sigma_{k=1}^{P}\theta_k |xT_3[x^{(k)}] - xR_1[x^{(k)}]|^2\}$) and obtain the initial error value $ET_3$ (the initial error value $ET_3$ is the result value of $EF(V2, U2_3|\overline{A})$ of formula (7)) between the pixel-level characteristic vector $V2$ of the object standard picture F2 and the pixel-level characteristic vector $U2_3$ of the third selected image (for example, the third initial object image $MT_3$).

Then, the optical parameter recommendation module 130 could obtain the quotient of $$\frac{ET_3}{Corr(xT_1, xR_1)},$$

the quotient of $$\frac{ET_3}{Corr(xT_2, xR_1)}$$

and the quotient of $$\frac{ET_3}{Corr(xT_3, xR_1)}$$

according to formula (7), and after obtaining the sum of these quotients (the sum calculation formula:

$$\sum_{i=1}^{Q} \frac{EF(V2, U2_i|\overline{A})}{Corr(xT_i, xR_1)} \Bigg),$$

calculates the expected value analysis function E of the operation formula (7) to obtain the expected value $\Phi(xR_1)$ of the first candidate optical parameter set $xR_1$.

According to the aforementioned principle, the optical parameter recommendation module 130 could obtain J expected values $\Phi(xR_j)$ of J different candidate optical parameter sets $xR_j$. The optical parameter recommendation module 130 could select the maximum one of J expected values $\Phi(xR_j)$, and uses (selects) the maximum one as the first (i.e., n=1) recommended optical parameter set $PR_1$, as shown in FIG. 3B.

After the first recommended optical parameter set $PR_1$ is obtained, step S124 is performed, and the automatic setting module 150 sets the AOI system 100 according to the first recommended optical parameter set $PR_1$. The automatic setting module 150 could set the light source module 160 and the camera module 140 according to the first recommended optical parameter set $PR_1$. For example, as $x^{(1)}$ of the first recommended optical parameter set $PR_1[x^{(1)}, x^{(2)}]$ is the exposure time and $x^{(2)}$ of the first recommended optical parameter set $PR_1[x^{(1)}, x^{(2)}]$ is the illuminating time, the automatic setting module 150 sets the exposure time of the camera module 140 to the value of $x^{(1)}$ of the first recommended optical parameter set $PR_1[x^{(1)}, x^{(2)}]$, and sets the illuminating time of the light source module 160 to the value of $x^{(2)}$ of the first recommended optical parameter set $PR_1[x^{(1)}, x^{(2)}]$. The automatic setting module 150 could automatically set the light source module 160 and/or the camera module 140 according to the recommended optical parameter set without manual operation. As a result, it could reduce the time required for setting the optical parameters and increase the effectiveness of the automatic setting of optical parameters. In another embodiment, the AOI system 100 could optionally omit the automatic setting module 150 if it is manually set.

In performing step S130, the error calculation module 120 sets the initial value of n to 1. The order of performing steps S130 and S124 is not limited, that is, one of steps S130 and S124 could be performed first or both of steps S130 and S124 could be performed simultaneously.

In step S140, the camera module 140 photographs the to-be-inspected object, under the AOI system 100 set by using the first recommended optical parameter set $PR_1$, to obtain the first recommended object image $MR_1$.

In step S150, the error calculation module 120 calculates the first recommended error value $ER_1$ (as shown in FIG. 3C(a)) between the object standard picture F2 and the first recommended object image $MR_1$, according to the optimized error function EF of formula (5), the pixel-level characteristic vector $V2$ of the object standard picture F2 and the pixel-level characteristic vector $U2$ of the first recommended object image $MR_1$.

As shown in FIG. 3C(a), the optical parameter recommendation module 130 could obtain a fitting curve C2 of the initial error values $ET_1$, $ET_2$, $ET_3$ and the recommended error value $ER_n$ by using curve fitting method.

In step S160, the error calculation module 120 determines whether the recommended error value converges. When the recommended error value converges has converged, the process proceeds to step S190; when the recommended error value has not converged, the process proceeds to step S170.

In step S160 of an embodiment, when the recommended error value is equal to or less than a convergence threshold or the difference between any two of the recommended error values in several iterations is within a convergence range, the error calculation module 120 determines that the error value has converged. The aforementioned "convergence threshold" is, for example, any value ranging between 0.1 to 0.3 (including endpoint), "several iterations" is, for example, equal to or greater than 3 times, and "convergence range" is, for example, between any value ranging between 0.1 to 0.3 (including the endpoint), but the embodiment of the present disclosure is not limited thereto.

As shown in FIG. 3C(b), the first recommended error value $ER_1$ obtained in step S150 is not less than the minimum error value obtained in the previous iteration (it is the minimum initial error value $ET_2$ of the initial error values obtained in $0^{th}$ iteration), and thus in the first iteration, the minimum error value still is initial error value $ET_2$. Since the first recommended error value $ER_1$ is not less than the minimum error value in the previous iteration (it is the initial error value $ET_2$ in $0^{th}$ iteration), the error calculation module 120 determines that the minimum error value has not yet converged, and thus the process proceeds to step S170.

In step S170, the optical parameter recommendation module 130 calculates n recommended error values, n recommended optical parameter sets, M initial error values and M initial optical parameter sets to obtain the $(n+1)^{th}$ recommended optical parameter set. In other words, the optical parameter recommendation module 130 calculates, by using formulas (6) and (7), all selected optical parameter sets $xT_i$ (including n recommended optical parameter sets and M initial optical parameter sets) and all obtained (calculated) error values (including n recommended error values and M initial error values) to obtain the next (i.e., $(n+1)^{th}$) recommended optical parameter set (i.e., the $(n+1)^{th}$ recommended optical parameter set).

Figure 3E:
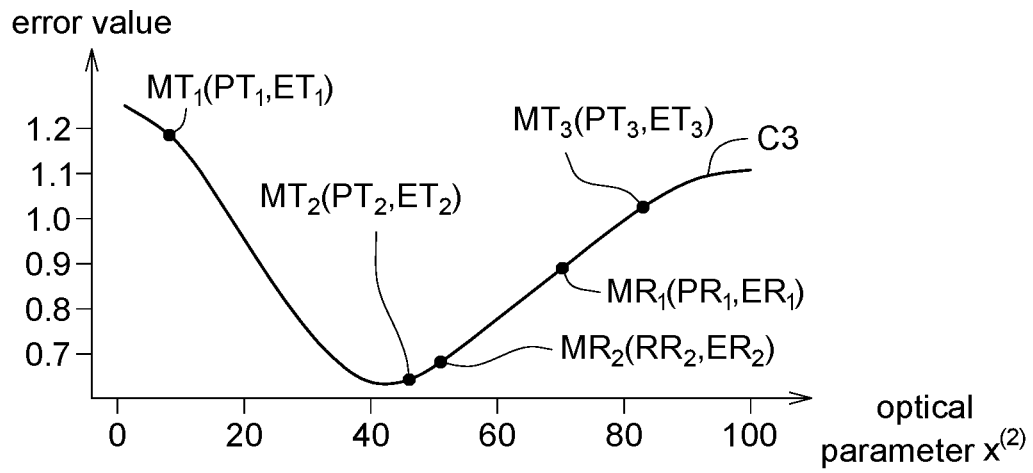
Figure 3E:
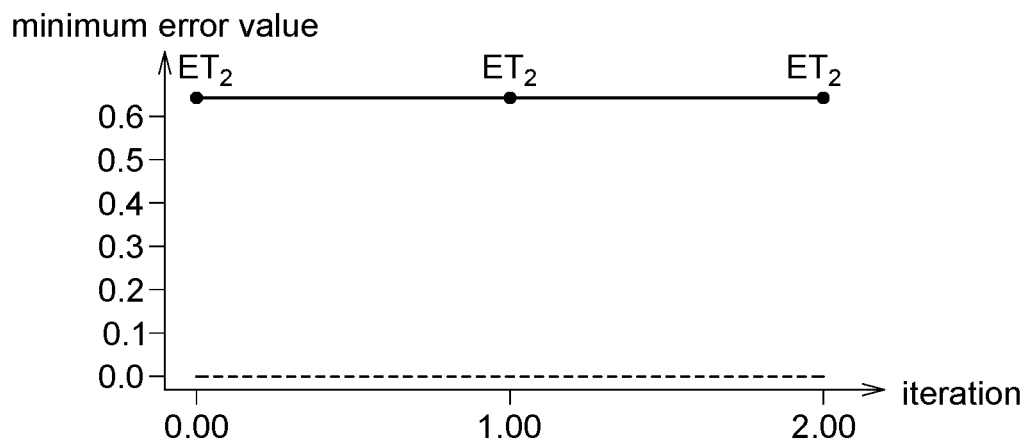
Figure 3F:
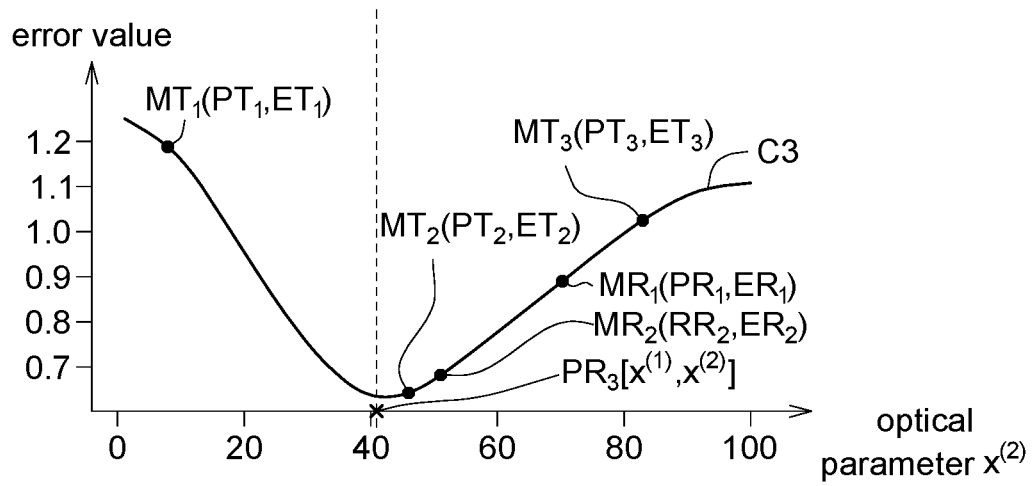

The process (corresponding to FIGS. 3D to 3E(b)) of obtaining the second recommended optical parameter set $PR_2$ through formulas (6) to (7) is described below. In the process, the optical parameter recommendation module 130 first calculates the expected values $\Phi(xR_j)$ of each of the plurality of the candidate optical parameter sets $xR_j$ with respect to all the selected optical parameter sets $xT_i$, and then uses (selects) the candidate optical parameter set $xR_j$ corresponding to the maximum one of the expected values $\Phi(xR_j)$ as the second recommended optical parameter set $PR_2$. The following takes the first candidate optical parameter sets $xR_1$ as an example to illustrate the process of calculating the expected value $\Phi(xR_j)$.

As shown in FIG. 3C(a), the number of selected optical parameter sets $xT_i$ is four (Q=4), which include three initial optical parameter sets $PT_1$, $PT_2$ and $PT_3$ and one recommended optical parameter set $PR_1$.

In case of i being equal to 1 and j being equal to 1, the optical parameter recommendation module 130 calculates, according to formula (6), the first (i.e., i=1) selected optical parameter set $xT_1$ (e.g., the initial optical parameter set $PT_1$) and the value of $Corr(xT_1, xR_1)$ of the first (i.e., j=1) candidate optical parameter set $xR_1$ (calculation formula: $Corr(xT_1, xR_1)=\exp\{-\Sigma_{k=1}^{P}\theta_k|xT_1[x^{(k)}]-xR_1[x^{(k)}]|^2\}$), and obtains the initial error value $ET_1$ (the initial error value $ET_1$ is the result value of $EF(V2, U2_1|\overline{A})$) of formula (7)) of the pixel-level characteristic vector $V2$ of the object standard picture $F2$ and the pixel-level characteristic vector $U2_1$ of the first (i.e., i=1) selected image (e.g., the first initial object image $MT_1$).

In a case of i being equal to 2 and j being equal to 1, the optical parameter recommendation module 130 calculates, according to formula (6), the second (i.e., i=2) selected optical parameter set $xT_2$ (e.g., the initial optical parameter set $PT_2$) and the value of $Corr(xT_2, xR_1)$ of the first (i.e., j=1) candidate optical parameter set $xR_1$ (calculation formula: $Corr(xT_2, xR_1)=\exp\{-\Sigma_{k=1}^{P}\theta_k|xT_2[x^{(k)}]-xR_1[x^{(k)}]|^2\}$), and obtains the initial error value $ET_2$ (the initial error value $ET_2$ is the result value of $EF(V2, U2_2|\overline{A})$) of formula (7)) between the pixel-level characteristic vector $V2$ of the object standard picture $F2$ and the pixel-level characteristic vector $U2_2$ of the second (i.e., i=2) selected image (e.g., the second initial object image $MT_2$).

In case of i being equal to 3 and j being equal to 1, the optical parameter recommendation module 130 calculates, according to formula (6), the third (i.e., i=3) selected optical parameter set $xT_3$ (e.g., the initial optical parameter set $PT_3$) and the value of $Corr(xT_3, xR_1)$ of the first (i.e., j=1) candidate optical parameter set $xR_1$ (calculation formula: $Corr(xT_3, xR_1)=\exp\{-\Sigma_{k=1}^{P}\theta_k|xT_3[x^{(k)}]-xR_1[x^{(k)}]|^2\}$), and obtains the initial error value $ET_3$ (the initial error value $ET_3$ is the result value of $EF(V2, U2_3|\overline{A})$) of formula (7)) of the pixel-level characteristic vector $V2$ of the object standard picture $F2$ and the pixel-level characteristic vector $U2_3$ of the third (i.e., i=3) selected image (e.g., the third initial object image $MT_3$).

In case of i being equal to 4 and j being equal to 1, the optical parameter recommendation module 130 calculates, according to formula (6), the fourth (i.e., i=4) selected optical parameter set $xT_4$ (e.g., the recommended optical parameter set $PR_1$) and the value of $Corr(xT_4, xR_1)$ of the first (i.e., j=1) candidate optical parameter set $xR_1$ (calculation formula: $Corr(xT_4, xR_1)=\exp\{-\Sigma_{k=1}^{P}\theta_k|xT_4[x^{(k)}]-xR_1[x^{(k)}]|^2\}$), and obtains the first recommended error value $ER_1$ (the first recommended error value $ER_1$ is the result value of $EF(V2, U2_4|\overline{A})$) of formula (7)) of the pixel-level characteristic vector $V2$ of the object standard picture $F2$ and the pixel-level characteristic vector $U2_4$ of the fourth (i.e., i=4) selected image (e.g., the recommended optical parameter set $PR_1$).

Then, the optical parameter recommendation module 130 could obtain the quotient of $$\frac{ET_3}{Corr(xT_1, xR_1)},$$

the quotient of $$\frac{ET_3}{Corr(xT_2, xR_1)}$$

and the quotient of $$\frac{ET_3}{Corr(xT_3, xR_1)}$$

according to formula (7), and after obtaining the sum of these quotients (the sum calculation formula:

$$\sum_{i=1}^{Q} \frac{EF(V2, U2_i | \overline{A})}{\text{Corr}(xT_i, xR_2)}),$$

the optical parameter recommendation module 130 calculates the expected value analysis function E of the operation formula (7) to obtain the expected value $\Phi(xR_2)$ of the first candidate optical parameter set $xR_1$.

According to the aforementioned principle, the optical parameter recommendation module 130 could obtain J expected values $\Phi(xR_j)$ of J different candidate optical parameter sets $xR_j$. The optical parameter recommendation module 130 could select the maximum one of J expected values $\Phi(xR_j)$, and uses (selects) the candidate optical parameter sets $xR_j$ corresponding to the maximum one of the expected values as the second (i.e., n=2) recommended optical parameter set $PR_2$, as shown in FIG. 3D.

After the second recommended optical parameter set $PR_2$ is obtained, step S175 is performed.

In step S175, the automatic setting module 150 sets the AOI system 100 according to the second ((n+1)$^{th}$) recommended optical parameter set $PR_2$.

In step S180, the value of n is accumulated by 1 (n=2), and then the next iteration is performed, that is, step S140 is performed again. In the second (n=2) iteration, under the AOI system being set with the second recommended optical parameter set $PR_2$, the camera module 140 photographs the to-be-inspected object to obtain the second recommended object image $MR_2$. Then, step S150 is performed, in the second iteration, the optical parameter recommendation module 130 perform calculation, according to the optimized error function EF of formula (5), the second recommended error value $ER_2$ between the object standard picture F2 and the second recommended object image $MR_2$, as shown in FIG. 3E(a). In FIG. 3E(a), the optical parameter recommendation module 130 could obtain a fitting curve C3 of the initial error values $ET_1$, $ET_2$, $ET_3$ and the recommended error values $ER_1$ and $ER_2$ by using curve fitting method. Then, in step S160, the optical parameter recommendation module 130 determines whether the recommended error value converges. When the recommended error value has converged, the process proceeds to step S190; when the recommended error value has not converged, the process proceeds to step S170. As shown in FIG. 3E(b), the second recommended error value $ER_2$ is not less than the first recommended error value $ER_1$ and the minimum error value (the initial error value $ET_2$) in the previous iterations (the 0$^{th}$ iteration and the first iteration), the optical parameter recommendation module 130 determines that the recommended error value has not converged, and then the process proceeds to step S170.

Figure 3G:
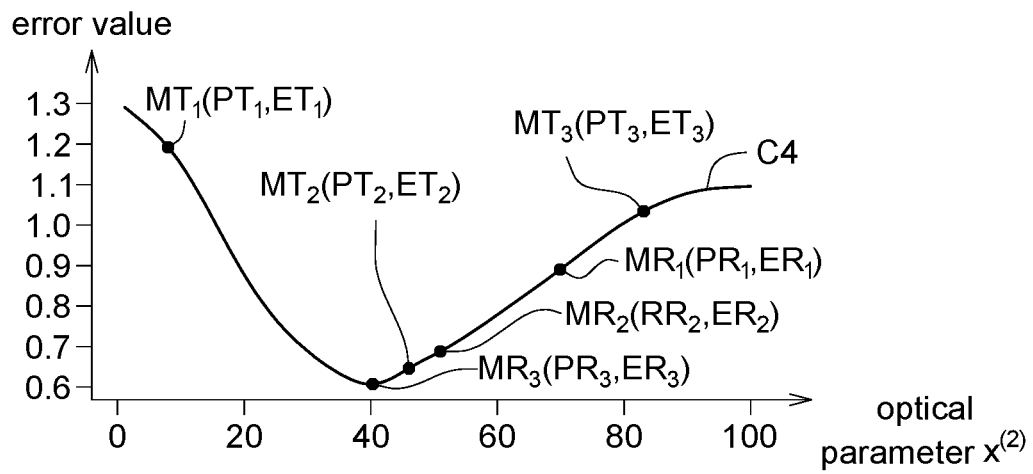
Figure 3G:
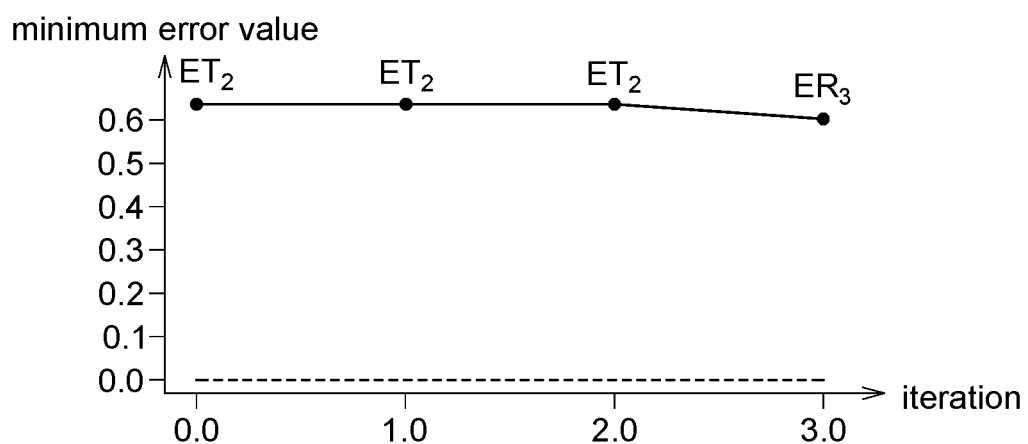

In step S170, the optical parameter recommendation module 130 obtains the third recommended optical parameter set $PR_3$ by using the aforementioned process of determining the recommended optical parameter set. In step S175, the automatic setting module 150 sets the AOI system 100 according to the third recommended optical parameter set $PR_3$. In step S180, the optical parameter recommendation module 130 updates value of n (n=3) and executes the next iteration (the third iteration) in step S180. In third iteration, similar to the aforementioned second iteration, steps S140 to S160 are performed to obtain the third recommended error value $ER_3$ (as shown in FIGS. 3F and 3G(a)). Then, in step S160, as shown in FIG. 3G(b), although the third recommended error value $ER_3$ is less than the recommended error values $ER_1$ and $ER_2$ in the previous iteration and the minimum error value $ET_2$, the optical parameter recommendation module 130 determines that the recommended error value has not converged due to the third recommended error value $ER_3$ being not less than the convergence threshold, and performs steps S170 to S180 to obtain the n$^{th}$ recommended optical parameter set $PR_n$ in the next iteration.

Figure 3H:
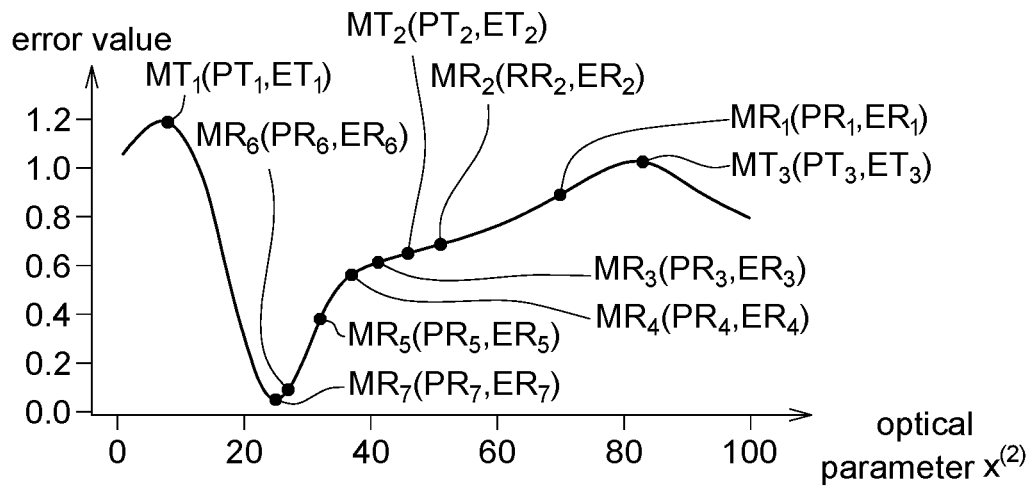
Figure 3H:
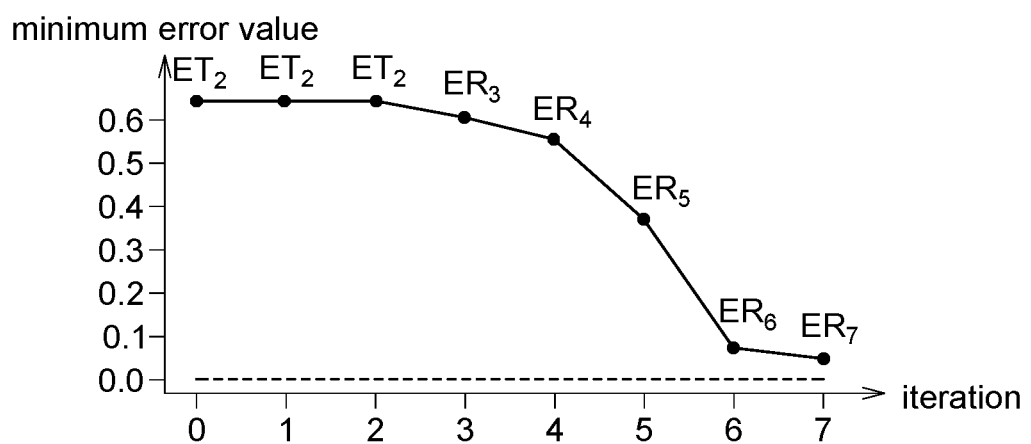

As shown in FIG. 3H(a), the optical parameter recommendation module 130 sequentially obtains the fourth recommended error value $ER_4$ in the fourth (i.e., n=4) iteration, the fifth recommended error value $ER_5$ in the fifth (i.e., n=5) iteration, the sixth recommended error value $ER_6$ in the sixth (i.e., n=6) iteration and the seventh recommended error value $ER_7$ in the seventh (i.e., n=7) iteration. As shown in FIG. 3H(b), in step S160 of the seventh iteration, the seventh recommended error value $ER_7$ has been lower than the aforementioned convergence threshold, and the optical parameter recommendation module 130 determines that the recommended error value $ER_7$ has converged accordingly. Then, in step S190, the optical parameter recommendation module 130 uses (selects) the minimum recommended error value in the seventh iteration (namely the seventh recommended optical parameter set $PR_7$ corresponding to the seventh recommended error value $ER_7$) as the optimal optical parameter set of the AOI system 100.

The light source module 160 and the camera module 140 of the AOI system 100 could be set according to the optimal optical parameter set, and operates on production line, such that the image captured by the camera module 140 has the better/best quality (for example, color presentation) for improving the accuracy of the AOI system 100 inspecting/detecting the products.

In summary, the embodiment of the present disclosure provides the method for automatically setting the automatic optical parameter and the AOI system using the same, which could automatically obtain the optimal optical parameter set by using machine learning technology. In the method for automatically setting the automatic optical parameter, it is necessary to perform up to tens of thousands, hundreds of thousands or even more iterations for P or all optical parameter sets in a short time, wherein the calculation process is much complicated and it must be performed by a computer but not (or can't) be done by a human brain. Since the method for automatically setting the optical parameter set is performed by the computer, at least one of all the optical parameters that affects the presentation (or quality) of the product image captured by the camera could be considered in the process to improve the quality of the captured product image and increase the inspection/detection accuracy. Compared with manual dimming, the embodiments of the present disclosure have at least one of the following technical effects: (1). misjudgment resulted from human factors could be avoided, thereby improving dimming stability; (2). the time required for dimming could be reduced; (3). labor cost could be reduced; (4). the number of optical parameter types added to the dimming process could be many or more; or/and (5). the detection accuracy of the AOI system could be increased.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A method for automatically setting optical parameters, suitable for an automatic optical inspection (Automated Optical Inspection, AOI) system, the AOI system comprises a camera module, an error calculation module, an automatic setting module and an optical parameter recommendation module, the method comprises:

photographing, by the camera module, a to-be-inspected object to obtain a recommended object image under the AOI system being set with a first recommended optical parameter set;

calculating, by the error calculation module, a recommended error value between an object standard picture and the recommended object image according to an optimized error function;

determining, by the error calculation module, whether the recommended error value converges;

when the recommended error value determined is not converged, calculating, by the optical parameter recommendation module, a second recommended optical parameter set according to the recommended error value and the first recommended optical parameter set, and setting, by the automatic setting module, the AOI system according to the second recommended optical parameter set; and when the recommended error value is determined converged, using, by the error calculation module, the first recommended optical parameter set as an optimal optical parameter set;

wherein the error calculation module, the automatic setting module and the optical parameter recommendation module are computer program modules.

2. The method according to claim 1, further comprises:

photographing, by the camera module, the to-be-inspected object to obtain a plurality of initial object images respectively under the AOI system being set with a plurality of initial optical parameter sets;

calculating, by the error calculation module, a plurality of initial error values between the object standard picture and the initial object images according to the optimized error function; and obtaining, by the optical parameter recommendation module, the first recommended optical parameter set according to the initial error values and the initial optical parameter sets.

3. The method according to claim 2, further comprises:

obtaining, by the optical parameter recommendation module, the second recommended optical parameter set according to the initial error values and the initial optical parameter sets when the recommended error value has not converged.

4. The method according to claim 2, further comprises:

calculating, by the optical parameter recommendation module, a plurality of expected values of a plurality of candidate optical parameter sets with respect to the initial optical parameter sets respectively; and using, by the optical parameter recommendation module, the candidate optical parameter set corresponding to the maximum one of the expected values as the first recommended optical parameter set.

5. The method according to claim 4, wherein step of calculating the expected values of the candidate optical parameter sets with respect to the initial optical parameter sets further comprises:

calculating, by the optical parameter recommendation module, a plurality of differences between each candidate optical parameter set and each initial optical parameter set; and calculating, by the optical parameter recommendation module, the expected values according to the differences and the initial error values.

6. The method according to claim 1, wherein the AOI system further comprises a light source module, the method further comprises:

setting, by the automatic setting module, the camera module and/or the light source module according to the optimal optical parameter set.

7. The method according to claim 1, wherein the AOI system further comprises an optimization module, and the method further comprises:

calculating, by the optimization module, on a training standard picture, an expert standard image, and a non-expert standard image to obtain the optimized error function.

8. The method according to claim 7, further comprises:

obtaining, by the optimization module, a plurality of optimization weights of the optimized error function by minimizing a between the training standard picture and the expert standard image and not minimizing an error between the training standard picture and the non-expert standard image.

9. An automatic optical inspection (Automated Optical Inspection, AOI) system, comprises:

a camera module, configured to photograph a to-be-inspected object to obtain a recommended object image under the AOI system being set with a first recommended optical parameter set;

an error calculation module, configured to calculate a recommended error value between an object standard picture and the recommended object image according to an optimized error function and determine whether the recommended error value converges;

an optical parameter recommendation module, configured to calculate a second recommended optical parameter set according to the recommended error value and the first recommended optical parameter set when the recommended error value has not converged; and an automatic setting module, configured to set the AOI system according to the second recommended optical parameter set;

wherein the error calculation module is further configured to use the first recommended optical parameter set as an optimal optical parameter set when the recommended error value has converged;

wherein the error calculation module, the automatic setting module and the optical parameter recommendation module are computer program modules.

10. The AOI system according to claim 9, wherein the camera module is further configured to photograph the to-be-inspected object to obtain a plurality of initial object images respectively under the AOI system being set with a plurality of initial optical parameter sets; the error calculation module is further configured to calculate on the object standard picture and the initial object images according to the optimized error function to obtain a plurality of initial error values between the initial object images and the object standard picture; and the optical parameter recommendation module is further configured to obtain the first recommended optical parameter set according to the initial error values and the initial optical parameter sets.

11. The AOI system according to claim 10, wherein the optical parameter recommendation module is further configured to obtain the second recommended optical parameter set according to the initial error values and the initial optical parameter sets when the recommended error value has not converged.

12. The AOI system according to claim 10, wherein the optical parameter recommendation module is further configured to:
calculate a plurality of expected values of a plurality of candidate optical parameter sets with respect to the initial optical parameter sets respectively; and
use the candidate optical parameter set corresponding to the maximum one of the expected values as the first recommended optical parameter set.

13. The AOI system according to claim 12, wherein the optical parameter recommendation module is further configured to:
calculate a plurality of differences between each candidate optical parameter set and each initial optical parameter set; and
calculate the expected values according to the differences and the initial error values.

14. The AOI system according to claim 9, further comprises a light source module, the automatic setting module is further configured to set the camera module and/or the light source module according to the optimal optical parameter set.

15. The AOI system according to claim 9, further comprises:
an optimization module, is configured to calculate on a training standard picture, an expert standard image, and a non-expert standard image to obtain the optimized error function.

16. The AOI system according to claim 15, wherein the optimization module is further configured to:
obtain a plurality of optimization weights of the optimized error function by minimizing an error between the training standard picture and the expert standard image and not minimizing an error between the training standard picture and the non-expert standard image, to obtain.

* * * * *